(12) United States Patent
Zhu et al.

(10) Patent No.: US 11,504,753 B2
(45) Date of Patent: Nov. 22, 2022

(54) CLEANING MODULE, SAMPLE ANALYZER WITH CLEANING MODULE AND CLEANING METHOD

(71) Applicant: Shenzhen New Industries Biomedical Engineering Co., Ltd., Guangdong (CN)

(72) Inventors: Liang Zhu, Guangdong (CN); Shuai Tong, Guangdong (CN); Wanguan Yi, Guangdong (CN); Li Yin, Guangdong (CN); Yi Hu, Guangdong (CN); Dingping Ban, Guangdong (CN)

(73) Assignee: Shenzhen New Industries Biomedical Engineering Co., Ltd., Guangdong (CN)

( * ) Notice: Subject to any disclaimer, the term of this patent is extended or adjusted under 35 U.S.C. 154(b) by 474 days.

(21) Appl. No.: 16/857,210

(22) Filed: Apr. 24, 2020

(65) Prior Publication Data

US 2021/0162473 A1   Jun. 3, 2021

(30) Foreign Application Priority Data

Nov. 29, 2019   (CN) .......................... 201911204425.3

(51) Int. Cl.
*B08B 9/08* (2006.01)
*G01N 35/02* (2006.01)
*G01N 35/10* (2006.01)
*B08B 9/093* (2006.01)

(52) U.S. Cl.
CPC ............ *B08B 9/0821* (2013.01); *B08B 9/093* (2013.01); *G01N 35/026* (2013.01); *G01N 35/1004* (2013.01); *G01N 35/025* (2013.01)

(58) Field of Classification Search
CPC ......... B08B 9/0821; B08B 9/093; B08B 9/32; B08B 9/20; B08B 3/04; B08B 13/00; G01N 35/026; G01N 35/1004; G01N 35/025; G01N 2035/0437; G01N 35/04; G01N 21/76; G01N 21/01; G01N 33/53; G01N 2021/0112
See application file for complete search history.

(56) References Cited

U.S. PATENT DOCUMENTS

2017/0088831 A1*   3/2017   Wang ................. G01N 35/1002
2022/0196695 A1*   6/2022   Kabe .................... G01N 35/025

FOREIGN PATENT DOCUMENTS

| CN | 104722526 B | * | 7/2017 |
| CN | 110501513 A | * | 11/2019 |
| CN | 110501513 A | | 11/2019 |

OTHER PUBLICATIONS

The first Office Action of the corresponding JP patent application No. 2020-078889, dated Mar. 30, 2021.

* cited by examiner

*Primary Examiner* — Benjamin R Whatley
*Assistant Examiner* — John McGuirk
(74) *Attorney, Agent, or Firm* — Gang Yu

(57) ABSTRACT

A cleaning module, a sample analyzer with the cleaning module and a cleaning method. Wherein, the cleaning module may include a disk body assembly and a cleaning assembly. The disk body assembly may include a disk body, the cleaning assembly and the disk body may move relatively, and the disk body and the cleaning assembly complete extraction of waste fluid and cleaning on a path of moving relatively.

16 Claims, 10 Drawing Sheets

CLEANING MODULE, SAMPLE ANALYZER WITH CLEANING MODULE AND CLEANING METHOD

TECHNICAL FIELD

The disclosure relates to a technical field of medical instruments, and in particular to a cleaning module, a sample analyzer with the cleaning module and a cleaning method.

BACKGROUND

Take a chemiluminiscence immunoassay analyzer in a sample analyzer for instance, a chemiluminiscence immunoassay technology is a high-sensitivity and high-specificity analytical instrument which develops rapidly all over the world in recent years and is configured to detect various immune indexes of samples including blood, urine or other body fluid, and so on in a clinical lab. A principle is to combine an antibody antigen reaction and a chemiluminescence technology, as to achieve high specificity and high sensitivity.

In the chemiluminescence analyzer, a reaction solution in a reaction vessel needs to be separated and cleaned, in order that a more accurate measurement result may be obtained. Generally, a mode of separation and cleaning is to inject cleaning fluid into the reaction vessel with a fluid injecting needle and fully blend it, then extract waste fluid with a waste fluid extracting needle, and repeatedly inject and extract the fluid for multiple times, and finally complete a whole process of separation and cleaning. During the process of separation and cleaning, the waste fluid extracting needle needs to enter into the reaction vessel to extract the waste fluid. In order to prevent the waste fluid extracting needle from cross contamination, the waste fluid extracting needle generally needs to be cleaned separately. In an existing cleaning mode of the waste fluid extracting needle, the waste fluid extracting needle generally moves upward after completion of extraction, then moves to a place above a cleaning pool, and moves downward and enters into the cleaning pool to clean the waste fluid extracting needle. After completion of cleaning of the waste fluid extracting needle, the waste fluid extracting needle moves to a place above a next reaction vessel to continue to work. The cleaning mode of the abovementioned waste fluid extracting needle is characterized in that the cleaning pool is generally placed on a periphery of a whole separating and cleaning module, thereby leading to a situation that the separating and cleaning module using the cleaning mode of the waste fluid extracting needle occupies a large instrument space, and the cleaning of the waste fluid extracting needle takes a long time with low efficiency, and driving apparatuses in multiple directions need to be configured to achieve movement of the waste fluid extracting needle.

SUMMARY

Embodiments of the disclosure are to provide a cleaning module, a sample analyzer with the cleaning module and a cleaning method, as to solve the problem that the cleaning module in the conventional art occupies a large space, and time of movement for cleaning a waste fluid extracting needle is long, and cleaning efficiency is low.

For achieving the abovementioned purpose, according to an aspect of the disclosure, a cleaning module is provided, including: a disk body assembly and a cleaning assembly. The disk body assembly may include a disk body. The cleaning assembly is provided with a waste fluid extracting station and a cleaning station. The waste fluid extracting station is an operating position when the cleaning assembly extracts waste fluid, and the cleaning station is an operation position when the cleaning assembly cleans. The cleaning assembly and the disk body may move relatively, and the cleaning station and the waste fluid extracting station are located inside the disk body.

In some embodiments, the disk body is provided with multiple reaction vessel placing portions, the waste fluid extracting station is located inside one of the multiple reaction vessel placing portions, and the cleaning station is located under the multiple reaction vessel placing portions.

In some embodiments, the cleaning assembly may further include a cleaning pool, the cleaning station is located in the cleaning pool, and the cleaning pool is located under the multiple reaction vessel placing portions.

In some embodiments, a side wall of the cleaning pool is provided with a fluid inlet, and a bottom wall of the cleaning pool is provided with a fluid outlet.

In some embodiments, the cleaning assembly may move along a vertical direction to achieve the cleaning station and/or the waste fluid extracting station.

In some embodiments, the disk body assembly may further include a first drive portion. The first drive portion is connected with the disk body to drive the disk body to rotate. The disk body is provided with the multiple reaction vessel placing portions and multiple through holes, and each of the multiple through holes is provided between two adjacent reaction vessel placing portions of the multiple reaction vessel placing portions. A center of each of the multiple reaction vessel placing portions and a center of each of the multiple through holes are located on an identical concentric circle.

In some embodiments, the cleaning assembly may include a second drive portion, a mounting portion and a transmission portion. The second drive portion is connected with the transmission portion, and the transmission portion is connected with the mounting portion to drive the mounting portion to move up and down in a vertical direction.

In some embodiments, the cleaning assembly may further include a waste fluid extracting needle. The waste fluid extracting needle is mounted on the mounting portion, as to move up and down along the mounting portion.

In some embodiments, the cleaning station is the operating position where the waste fluid extracting needle passes through a corresponding through hole of the multiple through holes to clean the waste fluid extracting needle.

In some embodiments, the cleaning module may further include a cleaning pool, and the through holes are provided corresponding to the cleaning pool, such that at least part of the waste fluid extracting needle after passing through the corresponding through hole enters into the cleaning pool.

In some embodiments, the cleaning assembly may further include a fluid injecting needle. The fluid injecting needle and the waste fluid extracting needle are mounted on the mounting portion in pairs. In an identical pair of the fluid injecting needle and the waste fluid extracting needle, the fluid injecting needle is located downstream of the waste fluid extracting needle. A horizontal distance from a fluid outlet of the fluid injecting needle to a fluid inlet of the waste fluid extracting needle is consistent with a distance from a center of one of the multiple through holes to a center of one of the multiple reaction vessel placing portions adjacent to the one of the plurality of through holes.

In some embodiments, there are multiple pairs of fluid injecting needles and waste fluid extracting needles, and the multiple pairs of fluid injecting needles and waste fluid extracting needles are provided on the concentric circle.

In some embodiments, the mounting portion is a plate-shaped structure, and the multiple pairs of waste fluid extracting needles and fluid injecting needles are provided on the mounting portion at intervals.

In some embodiments, distances from a center of each of the multiple through holes to centers of two reaction vessel placing portions of the multiple the reaction vessel placing portions adjacent to the one of the multiple through holes are equal.

In some embodiments, the second drive portion is a drive motor. The transmission portion may include a gear and a rack. The gear is mounted on a rotary shaft of the second drive portion, the rack cooperates with the gear, and the rack is connected with the mounting portion to drive the mounting portion to move up and down. The transmission portion may further include a sliding plate and a fixed plate. The rack is fixed on the sliding plate, the sliding plate is provided with a sliding chute, the fixed plate is fixed on the second drive portion and is provided with a guide rail fitting the sliding chute, and the mounting portion is mounted on the sliding plate.

In some embodiments, the reaction vessel placing portions are mounting through holes, and reaction vessels are placed inside the mounting through holes.

In some embodiments, the disk body is provided with a central hole passing through a central shaft, and the transmission portion is provided inside the central hole in a penetrating manner.

In some embodiments, the first drive portion may include a drive motor, a synchronous belt and a synchronous pulley. The synchronous pulley is mounted at a bottom of the disk body and is provided with a mounting hole fitting the central hole, and the drive motor is connected with the synchronous pulley through the synchronous belt.

In some embodiments, the cleaning module may further include a reaction vessel detection sensor and a fluid detection sensor. The reaction vessel detection sensor and the fluid detection sensor are provided corresponding to reaction vessels.

In some embodiments, the cleaning assembly may further include a waste fluid extracting needle, a fluid injecting needle and a fixing frame. The disk body is provided with a central hole passing through a center of the disk body, the fixing frame is provided inside a central hole in a penetrating manner, the fluid injecting needle is fixed on the fixing frame, the waste fluid extracting needle is mounted on the mounting portion, and the transmission portion is located inside the central hole of the disk body.

According to another aspect of the disclosure, a sample analyzer is provided, including a sample analyzer body and a cleaning module. The cleaning module is the abovementioned cleaning module.

According to another aspect of the disclosure, a cleaning method is provided. The cleaning method may include: A, a waste fluid extracting needle is located at a waste fluid extracting station, and the waste fluid extracting needle moves downward to extract waste fluid inside a reaction vessel; B, the waste fluid extracting needle moves upward after completion of extraction of the waste fluid; C, a disk body drives the reaction vessel to rotate to a cleaning station; D, the waste fluid extracting needle moves downward to pass through the disk body and enter into a cleaning pool; E, when the cleaning pool sprays cleaning fluid to clean the waste fluid extracting needle, a fluid injecting needle injects the cleaning fluid into the reaction vessel; F, the waste fluid extracting needle moves upward after completion of cleaning of the waste fluid extracting needle and after completion of injection of the fluid injecting needle; and G, the disk body continues to rotate, in this way the waste fluid extracting needle is located at a next waste fluid extracting station.

In some embodiments, before the step A, the cleaning method may further include: the cleaning fluid is injected into the reaction vessel.

In some embodiments, the disk body is provided with a through hole, the through hole is provided corresponding to the cleaning pool, and the waste fluid extracting needle passes through the through hole to enter into the cleaning pool for cleaning.

With the adoption of the technical solution of the disclosure, when the cleaning module works, the cleaning station and the waste fluid extracting station are located inside the disk body. In this way, the cleaning assembly does not need to move outside the cleaning assembly and the disk body for cleaning and extracting the waste fluid. With the adoption of the abovementioned structure, the cleaning module occupies a small space, and the time of movement for cleaning the waste fluid extracting needle is short, and the cleaning efficiency is high. The technical solution of the disclosure effectively solves the problem that the cleaning module in the conventional art occupies the large space, and the time of movement for cleaning the waste fluid extracting needle is long, and the cleaning efficiency is low.

BRIEF DESCRIPTION OF THE DRAWINGS

The accompanying drawings described herein are used to provide a further understanding of the disclosure, and constitute a part of the application, and the exemplary embodiments of the disclosure and the description thereof are used to explain the disclosure, but do not constitute improper limitations to the disclosure. In the drawings.

Figure 1:
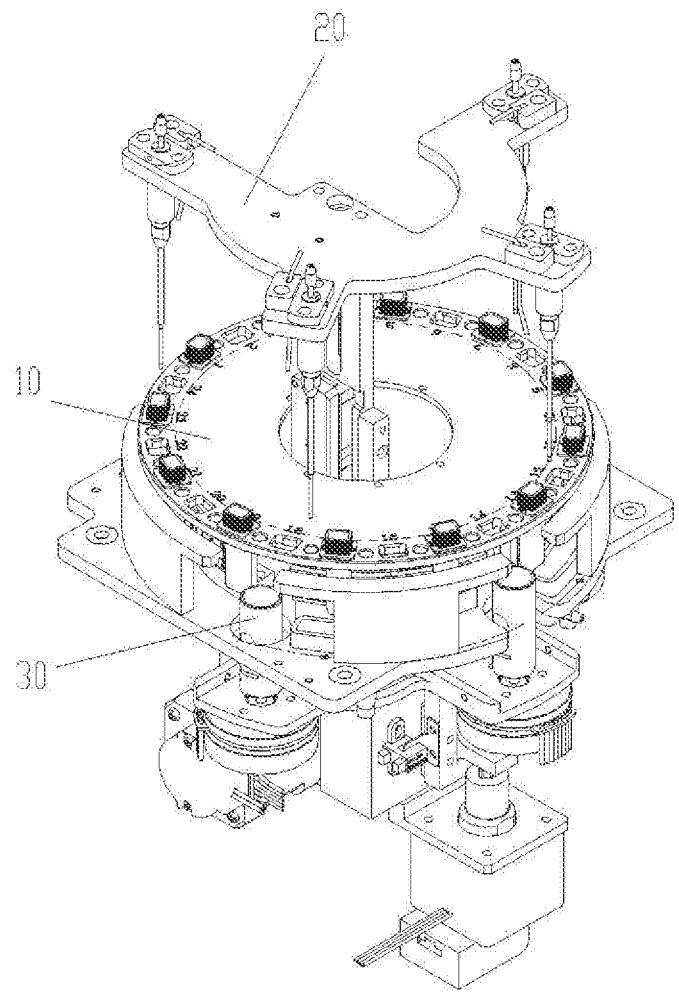
FIG. 1 shows a schematic diagram of a stereo structure of an embodiment of a cleaning module according to the disclosure.

Herein, the abovementioned drawings may include the following reference numbers.

10: Disk body assembly; 11: Disk body; 111: Reaction vessel placing portion; 112: Through hole; 12: First drive portion; 20: Cleaning assembly; 21: Second drive portion; 22: Mounting portion; 23: Transmission portion; 231: Gear;

232: Rack; 233: Sliding plate; 234: Fixed plate; 24: Waste fluid extracting needle; 25: Cleaning pool; 251: Fluid inlet; 252: Fluid outlet; 26: Fluid injecting needle; 30: Blending assembly; 31: Third drive portion; 32: Lifting frame; 33: Eccentric rotor structure; 40: Magnetic adsorption structure; 50: Reaction vessel detection sensor; and 60: Fluid detection sensor.

DETAILED DESCRIPTION OF THE EMBODIMENTS

It is to be noted that embodiments in the application and features in the embodiments may be combined with each other without conflict. The disclosure will be described below in detail with reference to drawings and in combination with the embodiments.

It should be pointed out that the detailed description below is exemplary and intended to provide further description of the application. Unless otherwise pointed out explicitly, all technical and scientific terms used herein have meanings identical with that generally understood by those of ordinary skill in the art of the application.

In order to facilitate description, a spatial relative term may be used here, such as "over", "above", "on an upper surface" and "on", to describe a spatial location relation between a device or a feature shown in the drawing and other devices or other features. It is to be understood that the spatial relative term aims at including different orientations of the device during use or operation outside the orientation described in the drawing. For example, if the device in the drawing is inverted, it may be described as that the device "above other devices or other structures" or "over other devices or other structures" shall be positioned "under other devices or other structures" or "below other devices or other structures". Therefore, an exemplary term "above" may include two orientations: "above" and "under". As an alternative, the device may be positioned with other different modes (90° rotation or positioned at other orientations), and the spatial relative description used here needs to be explained correspondingly.

Now, the exemplary embodiments according to the application will be described below in more detail with reference to the drawings. However, these exemplary embodiments may be implemented in many different ways and should not be explained to limit the embodiments elaborated herein. It should be understood that these embodiments are provided to make the application thoroughly and integrally disclosed, and to sufficiently pass a conception of the exemplary embodiments to those of ordinary skill in the art. In the drawings, for clarity, thicknesses of a layer and an area may be enlarged, and identical reference numbers are used to indicate identical devices. Therefore, descriptions thereof are omitted.

As shown in FIGS. 1-11, a cleaning module of the embodiment may include: a disk body assembly 10 and a cleaning assembly 20. The disk body assembly 10 may include a disk body 11. The cleaning assembly 20 may include a waste fluid extracting needle 24. The waste fluid extracting needle 24 has a cleaning station and a waste fluid extracting station. The cleaning assembly 20 and the disk body 11 may move relatively. An identical straight line direction on which the cleaning station and the waste fluid extracting station are located is vertical to a relative moving direction of the cleaning assembly 20 and the disk body 11. The waste fluid extracting station is an operating position when the waste fluid extracting needle 24 extracts waste fluid, and the cleaning station is an operation position when the cleaning assembly cleans.

With the adoption of the technical solution of the embodiment, when the cleaning module works, the cleaning assembly 20 and the disk body 11 move relatively, thereby achieving extraction of the waste fluid and cleaning. In this way, the cleaning assembly 20 does not need to move to the outside of a relative movement track of the cleaning assembly 20 and the disk body 11. With the adoption of the abovementioned structure and an operating mode, the cleaning module occupies a small space, time of movement of the waste fluid extracting needle is short, and cleaning efficiency is high. The technical solution of the embodiment effectively solves the problem that the cleaning module in the conventional art occupies a large space, time of movement for cleaning waste fluid extracting needle is long, and the cleaning efficiency is low. It is to be noted that a cleaning pool in the embodiment is stationary, namely, the cleaning station is stationary. A reaction vessel moves along rotation of the disk body 11. The waste fluid extracting needle 24 in the waste fluid extracting station moves in a vertical direction only, and does not move in a horizontal direction. But a reaction vessel corresponding to the waste fluid extracting needle 24 is changing.

As shown in FIGS. 1-11, the cleaning module of the embodiment may include: the disk body assembly 10 and the cleaning assembly 20. The disk body assembly 10 may include the disk body 11 and a first drive portion 12. The first drive portion 12 is connected with the disk body 11 to drive the disk body 11 to rotate. The disk body 11 is provided with multiple reaction vessel placing portions 111 and multiple through holes 112, and each of through holes 112 is provided between two adjacent reaction vessel placing portions 111. A center of each of the multiple reaction vessel placing portions 111 and a center of each of the multiple through holes 112 are located on an identical concentric circle. The cleaning assembly 20 may include a second drive portion 21, a mounting portion 22 and a transmission portion 23. The second drive portion 21 is connected with the transmission portion 23, and the transmission portion 23 is connected with the mounting portion 22 to drive the mounting portion 22 to move up and down in the vertical direction. The cleaning station is located inside the reaction vessel placing portions 111, and the waste fluid extracting station is located under the reaction vessel placing portions 111. When the cleaning module works, movement of the reaction vessel placing portions 111 and the through holes 112 is achieved through rotation of the disk body 11. The second drive portion 21 of the cleaning assembly drives the mounting portion 22 through the transmission portion 23 to move up and down, without needing to move horizontally. On one hand, the abovementioned structure reduces a drive portion for the cleaning assembly to drive the mounting portion 22 to move horizontally, and on the other hand, operating efficiency of the cleaning assembly is greatly improved. What's more, the abovementioned cleaning module occupies the small space.

It is to be noted that the cleaning module of the embodiment may further include a base. The first drive portion 12 is mounted on the base, and the second drive portion 21 is mounted on the base. The rotation of the disk body substitutes horizontal movement of the mounting portion 22. The concentric circle may not only include circles with identical radius, but circles with different radiuses.

Figure 3:
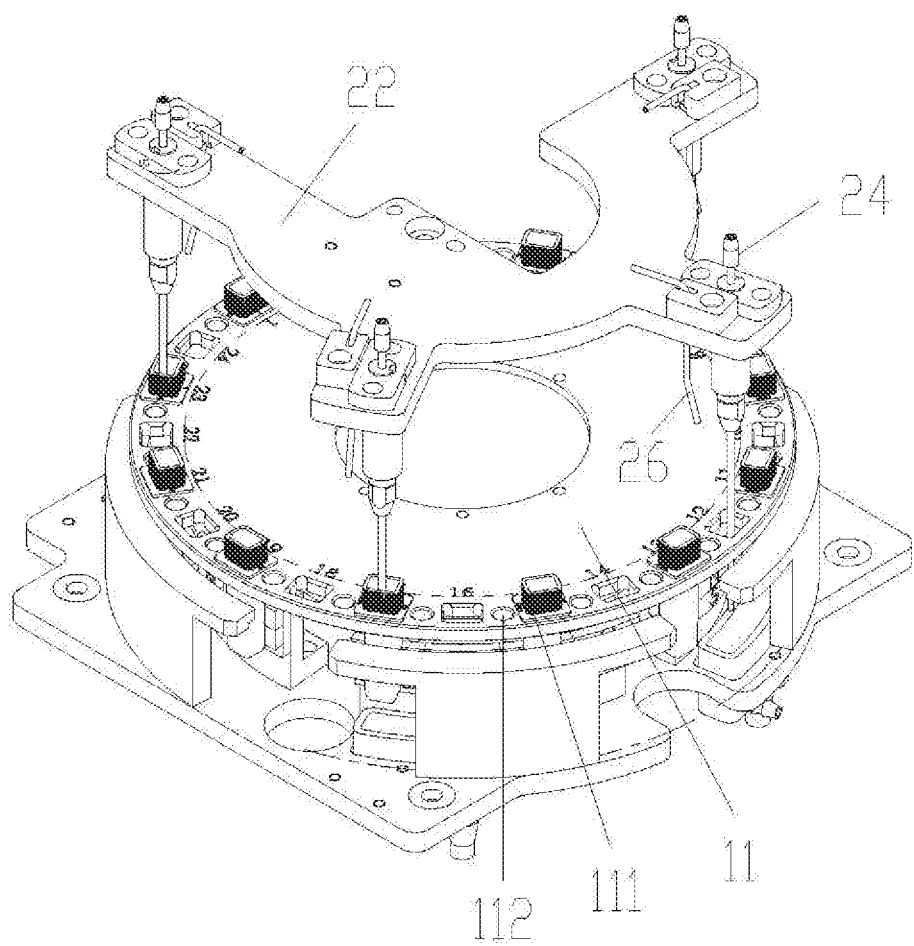
FIG. 3 shows a structure diagram of a cleaning assembly of a cleaning module of FIG. 1.
Figure 9:
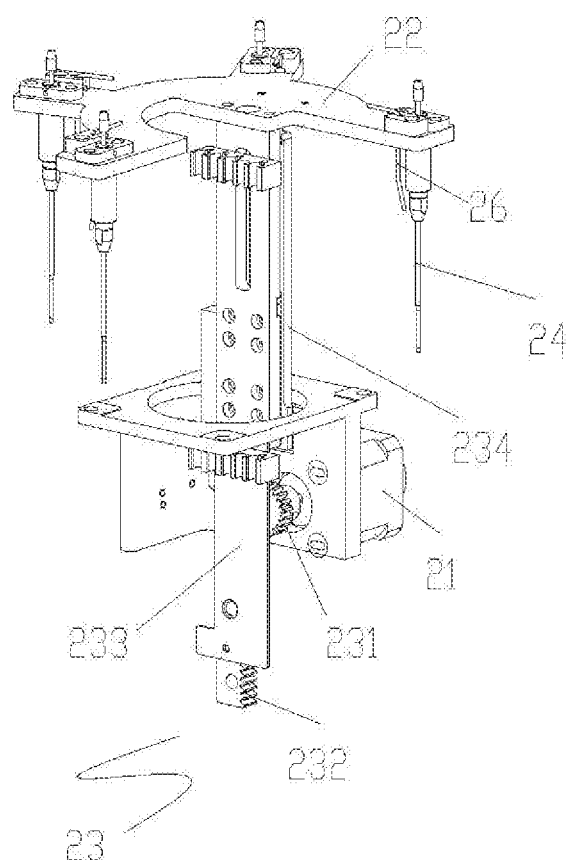
FIG. 9 shows a structure diagram of a cleaning assembly of a cleaning module of FIG. 1.

As shown in FIG. 1, FIG. 3 and FIG. 9, in the technical solution of the embodiment, the cleaning assembly 20 may further include the waste fluid extracting needle 24. The waste fluid extracting needle 24 is mounted on the mounting portion 22, as to move up and down along the mounting portion 22. During operation, the waste fluid extracting needle 24 moves downward in the vertical direction to extract the waste fluid from a nth reaction vessel, then moves upward in the vertical direction. At the moment, a lowest point of the waste fluid extracting needle 24 is higher than a highest point of the reaction vessel. The disk body 11 continues to rotate. When the waste fluid extracting needle 24 is located at a place over a first through hole 112 after the nth reaction vessel in the vertical direction, the disk body 11 stops rotating, the waste fluid extracting needle 24 moves downward in the vertical direction to pass through the through hole 112 and enter into the cleaning pool 25, the waste fluid extracting needle 24 is cleaned with cleaning fluid in the cleaning pool, the waste fluid extracting needle 24 moves upward in the vertical direction after completion of cleaning, the lowest point of the waste fluid extracting needle 24 is higher than the highest point of the reaction vessel, and the disk body 11 continues to rotate. When the waste fluid extracting needle 24 is located at a place over a (n+1)th reaction vessel, the disk body 11 stops rotating, the waste fluid extracting needle 24 extracts the waste fluid inside the (n+1)th reaction vessel, and the abovementioned steps are repeated. With the adoption of the abovementioned structure, the horizontal movement of the waste fluid extracting needle 24 is reduced through the movement of the disk body 11, thereby improving the cleaning efficiency. In addition, the waste fluid extracting needle 24 does not need to move to the outside of the relative movement track of the cleaning assembly 20 and the disk body 11. In this way, the space occupied by the cleaning module is reduced. The technical solution of the embodiment improves the efficiency, while reducing a drive part and the space occupied by the cleaning module.

Figure 6:
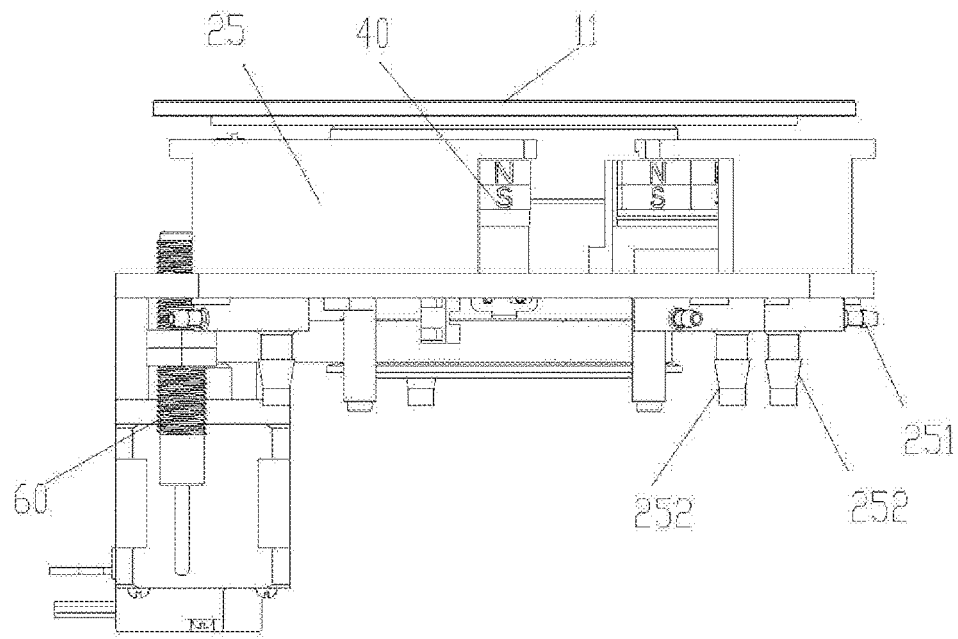
FIG. 6 shows a schematic diagram of a mounting structure of a magnetic adsorption structure of a cleaning module of FIG. 1.
Figure 7:
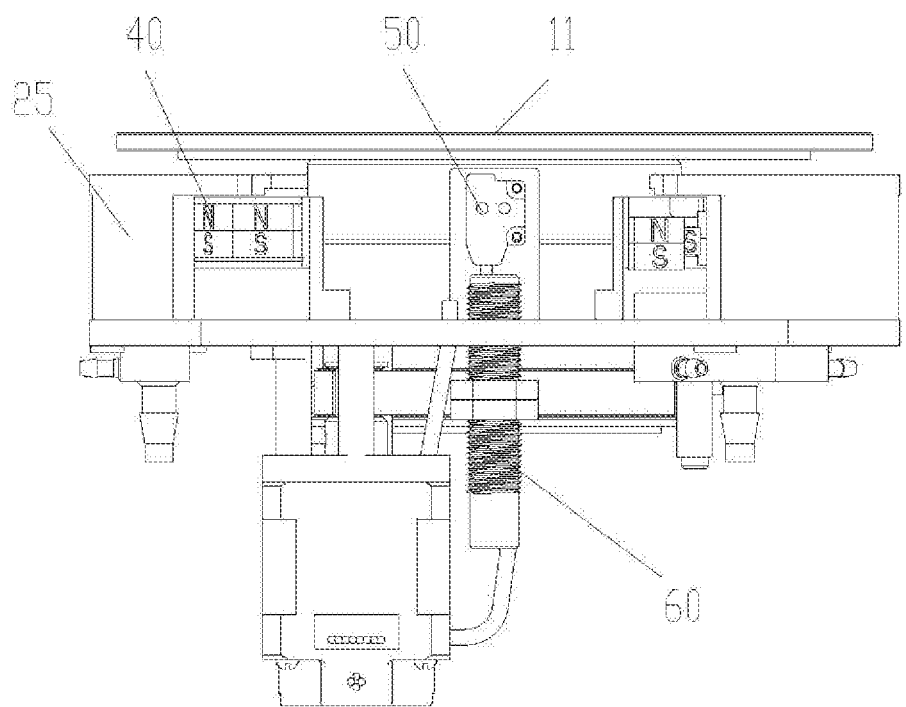
FIG. 7 shows a schematic diagram of a mounting structure of a reaction vessel detection sensor and a fluid detection sensor of a cleaning module of FIG. 1.
Figure 11:
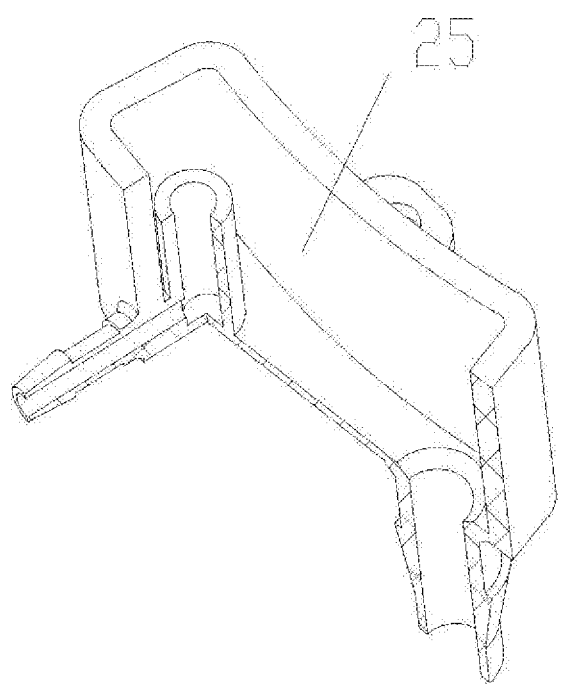
FIG. 11 shows a structure diagram of a cleaning pool of a cleaning module of FIG. 1.

As shown in FIG. 6, FIG. 7 and FIG. 11, in the technical solution of the embodiment, the cleaning assembly 20 may further include the cleaning pool 25. The waste fluid extracting station is located inside the cleaning pool 25, and the cleaning pool 25 is located under the reaction vessel placing portions 111. The cleaning pool 25 is located under the disk body 11 and corresponding to the through holes 112, such that the waste fluid extracting needle 24 may enter into the cleaning pool 25 after passing through the through hole 112. With the adoption of configuration of the cleaning pool 25, on one hand, a space under the disk body 11 is fully utilized and accordingly an instrument space occupied by the cleaning assembly 20 is greatly reduced, and on the other hand, extraction of the waste fluid and cleaning of the waste fluid extracting needle 24 may be synchronously and independently implemented, in this way the cleaning efficiency of the cleaning module is greatly improved.

As shown in FIG. 11, in the technical solution of the embodiment, a side wall of the cleaning pool 25 is provided with a fluid inlet 251, and a bottom wall of the cleaning pool 25 is provided with a fluid outlet 252. The abovementioned structure has low processing cost and convenient configuration. The cleaning fluid enters into the cleaning pool 25 from the side wall of the cleaning pool 25, in this way the cleaning fluid easily forms "surge", and accordingly it is convenient to clean. Specifically, the cleaning pool 25 is provided with a surge cleaning drum. The surge cleaning drum is connected with the fluid inlet. The waste fluid extracting needle 24 is located inside the surge cleaning drum during cleaning. An upper surface of the surge cleaning drum is lower than an upper surface of the cleaning pool 25. The abovementioned structure may save the cleaning fluid. The surge cleaning drum needs to be full of the cleaning fluid, while the cleaning pool 25 is not required to be full of the cleaning fluid. The fluid outlet is provided on the bottom wall of the cleaning pool 25, in this way it is easy to completely drain the cleaning fluid after cleaning.

Figure 2:
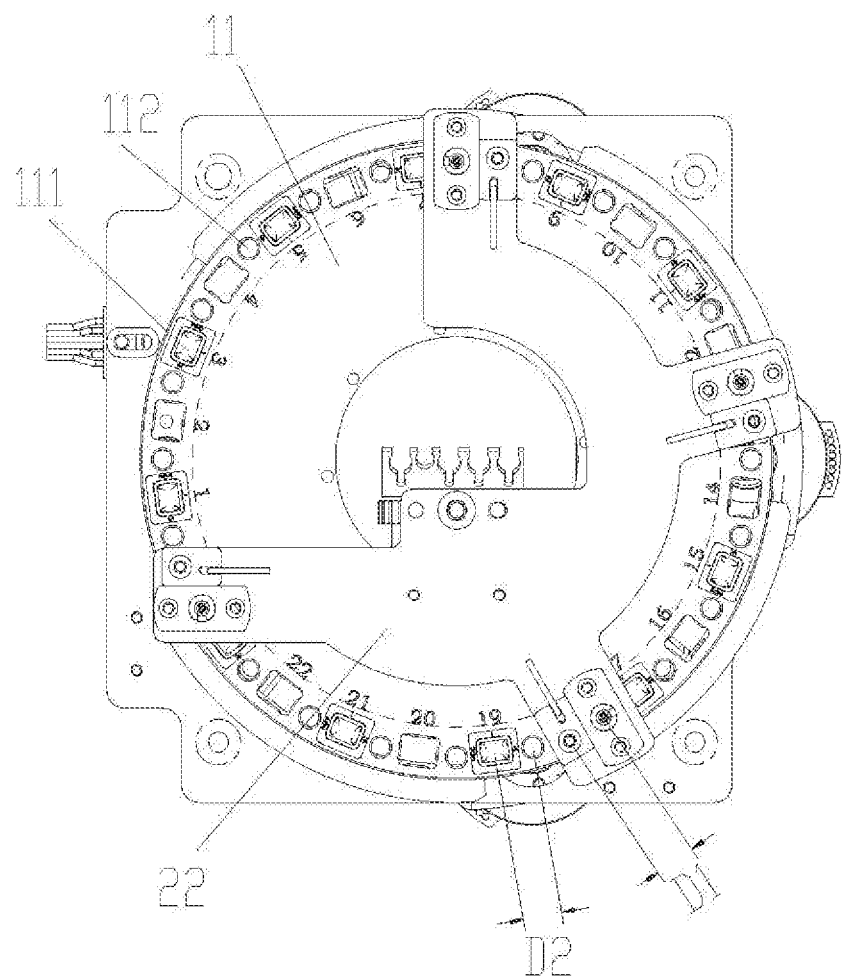
FIG. 2 shows a schematic diagram of a top view of a cleaning module of FIG. 1.

As shown in FIG. 3, in the technical solution of the embodiment, the cleaning assembly 20 may further include a fluid injecting needle 26. The fluid injecting needle 26 and the waste fluid extracting needle 24 are mounted on the mounting portion 22 in pairs. In an identical pair of the fluid injecting needle 26 and the waste fluid extracting needle 24, the fluid injecting needle 26 is located downstream of the waste fluid extracting needle 24. As shown in FIG. 2, a distance D1 from the fluid outlet of the fluid injecting needle 26 to the fluid inlet of the waste fluid extracting needle 24 is consistent with a distance D2 from one through hole to the reaction vessel placing portion 111 adjacent to the through hole. The fluid injecting needle 26 is provided, such that the fluid injecting needle 26 may inject the cleaning fluid into the reaction vessel after completion of extraction of the waste fluid inside the reaction vessel. Specifically, when the waste fluid extracting needle 24 extracts the waste fluid inside the nth reaction vessel completely, the disk body 11 continues to rotate. When the disk body 11 rotates until the first through hole 112 after the nth reaction vessel is right below the waste fluid extracting needle 24, the fluid injecting needle 26 is right over the nth reaction vessel, the mounting portion 22 moves downward, the waste fluid extracting needle 24 enters into the cleaning pool 25 for cleaning, and the fluid injecting needle 26 injects the cleaning fluid into the nth reaction vessel. The waste fluid extracting needle 24 and the fluid injecting needle 26 synchronously work, in this way the time is greatly saved, and the efficiency is improved. It is to be noted that the downstream is a direction that the disk body 11 rotates in a next step when the disk body 11 rotates. For example, the (n+1) reaction vessel is located downstream of the nth reaction vessel.

As shown in FIGS. 1-3, in the technical solution of the embodiment, there are multiple pairs of fluid injecting needle 26 and waste fluid extracting needles 24, and the multiple pairs of waste fluid extracting needle 24 and fluid injecting needles 26 are provided on the concentric circle. In this way, an inside of the reaction vessel may be cleaned more completely. Specifically, there are four pairs of fluid injecting needles 26 and waste fluid extracting needles 24, and the four pairs of fluid injecting needles 26 and waste fluid extracting needles 24 are provided at intervals. There is the waste fluid extracting needle 24 or the fluid injecting needle 26 only in a last pair of fluid injecting needle 26 and waste fluid extracting needle 24.

As shown in FIGS. 1-3, the mounting portion 22 is a plate-shaped structure, and the multiple pairs of waste fluid extracting needles 24 and fluid injecting needle 26 are uniformly provided on the mounting portion 22. It is to be noted that one waste fluid extracting needle 24 and one fluid injecting needle 26 form one pair of waste fluid extracting needle 24 and fluid injecting needle 26. The mounting portion 22 is a three-quarter annular plate, having three protruded plates. The abovementioned structure greatly saves an amount of a material of the mounting portion 22. A missing one-quarter annular plate of the mounting portion 22 facilitates an operation of a next link. For example, the mounting portion 22 will not form interference to a part of a next link when the reaction vessel is taken out in the next link.

As shown in FIGS. 1-3, in the technical solution of the embodiment, the mounting portion 22 has an avoiding portion. The waste fluid extracting needle 24 may include an initial waste fluid extracting needle 24 and a final waste fluid extracting needle 24. The avoiding portion is located between the initial waste fluid extracting needle 24 and the final waste fluid extracting needle 24. In this way, the mounting portion 22 will not form the interference to the next link. Specifically, the avoidance portion is the missing one-quarter annular plate.

Figure 4:
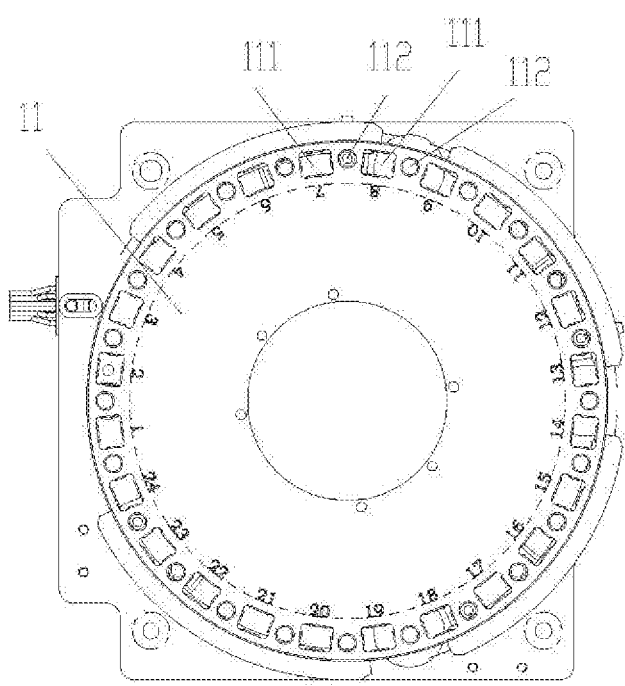
FIG. 4 shows a schematic diagram of a top view of a disk body of a cleaning module of FIG. 1.
Figure 5:
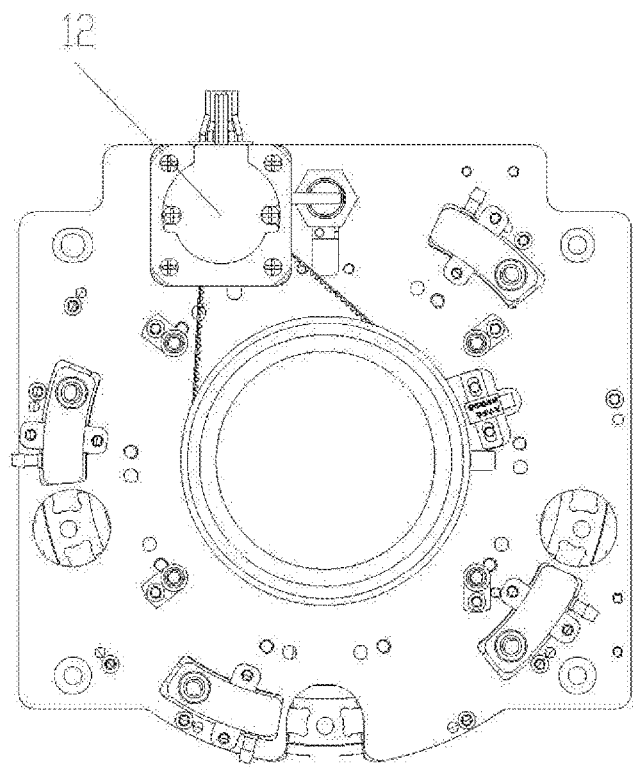
FIG. 5 shows a schematic diagram of a mounting structure of a first drive portion of a cleaning module of FIG. 1.

As shown in FIG. 4, in the technical solution of the embodiment, distances from the through hole 112 to two adjacent reaction vessel placing portions 111 are equal. The abovementioned structure makes the disk body 11 have strong regularity when rotating, and rotating distances when extracting the waste fluid and cleaning the waste fluid extracting needle 24 are equal.

As shown in FIG. 9, in the technical solution of the embodiment, the second drive portion 21 is a drive motor. The transmission portion 23 may include a gear 231 and a rack 232. The gear 231 is mounted on a rotary shaft of the second drive portion 21, the rack 232 cooperates with the gear 231, and the rack 232 is connected with the mounting portion 22 to drive the mounting portion 22 to move up and down. The gear 231 cooperates with the rack 232, such that the mounting portion 22 is stable when moving. It is to be noted that the rack 232 may be directly or indirectly connected with the mounting portion 22.

As shown in FIG. 9, in the technical solution of the embodiment, the transmission portion 23 may further include a sliding plate 233 and a fixed plate 234. The rack 232 is fixed on the sliding plate 233, the sliding plate 233 has a sliding chute, the fixed plate 234 is fixed on the second drive portion 21, the fixed plate 234 has a guide rail fitting the sliding chute, and the mounting portion 22 is mounted on the sliding plate 233. By the limitation of the sliding chute and the guide rail, a moving position of the mounting portion will be more accurate when the mounting portion 22 moves. Specifically, the rack 232 is provided vertically.

As shown in FIGS. 1-3, in the technical solution of the embodiment, the reaction vessel placing portion 111 is a mounting through hole, and the reaction vessel is configured inside the mounting through hole. The mounting through hole has easy processing and convenient use. In this way, subsequent blending of the reaction vessel is facilitated.

Figure 10:
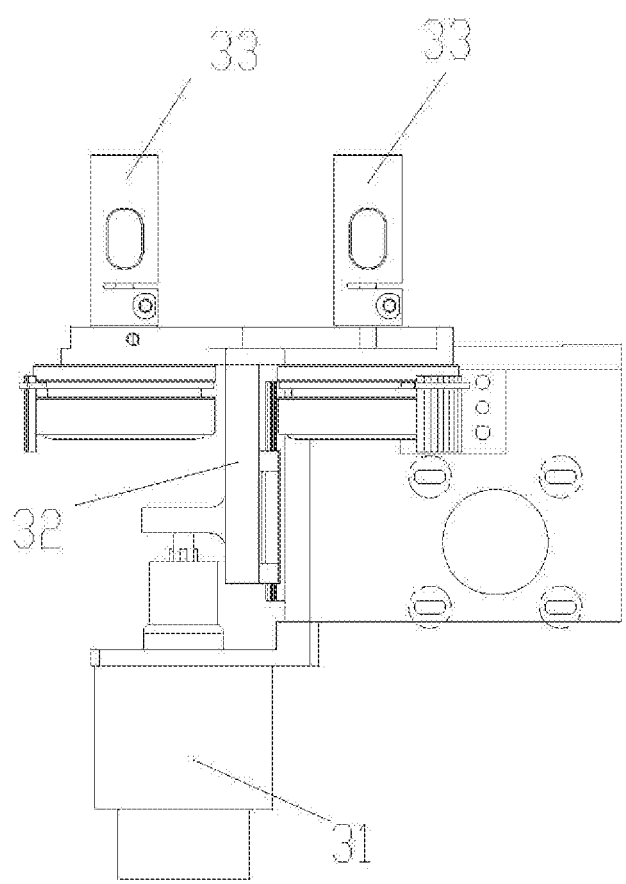
FIG. 10 shows a structure diagram of a blending assembly of a cleaning module of FIG. 1.

As shown in FIG. 10, in the technical solution of the embodiment, the cleaning module may further include a blending assembly 30. The blending assembly 30 is located at a lower part of the reaction vessel placing portion 111 and located downstream of the fluid injecting needle 26. The blending assembly 30 is provided, such that the fluid inside the reaction vessel may be cleaned more completely.

As shown in FIG. 10, in the technical solution of the embodiment, the blending assembly 30 may include a third drive portion 31, a lifting frame 32 and an eccentric rotor structure 33. The lifting frame 32 is mounted on the third drive portion 31, the eccentric rotor structure 33 is mounted on the lifting frame 32 and has a blending position which is in contact with the reaction vessel and an avoiding position which is far away from the reaction vessel. The abovementioned structure has the low processing cost and convenient operation. It is to be noted that the third drive portion 31 is a linear motor, as an alternative, an electric push rod and the like. Preferably, the linear motor is taken in the embodiment to implement driving. The lifting frame 32 may include a sliding block and a guide rail structure. There is one linear motor. The lifting frame 32 is provided with multiple blending assemblies 30, and four fluid injecting needles 26 may be provided with four blending assemblies 30. One linear motor drives the four blending assemblies 30 synchronously to move up and down, in this way drive devices are greatly saved.

As shown in FIG. 10, in the technical solution of the embodiment, the eccentric rotor structure 33 may include an eccentric rotor and a blending rotor provided on the eccentric rotor. An upper part of the blending rotor has a fitting hole, and the reaction vessel is located inside the fitting hole, as to blend the fluid inside the reaction vessel. The abovementioned structure has the low processing cost and good blending effect. Specifically, a lower part of the blending rotor has a mounting hole, a side of the mounting hole has an opening, two sides of the opening have through holes, and a bolt passes through the through hole to be fastened with a rotary shaft of the eccentric motor.

Figure 8:
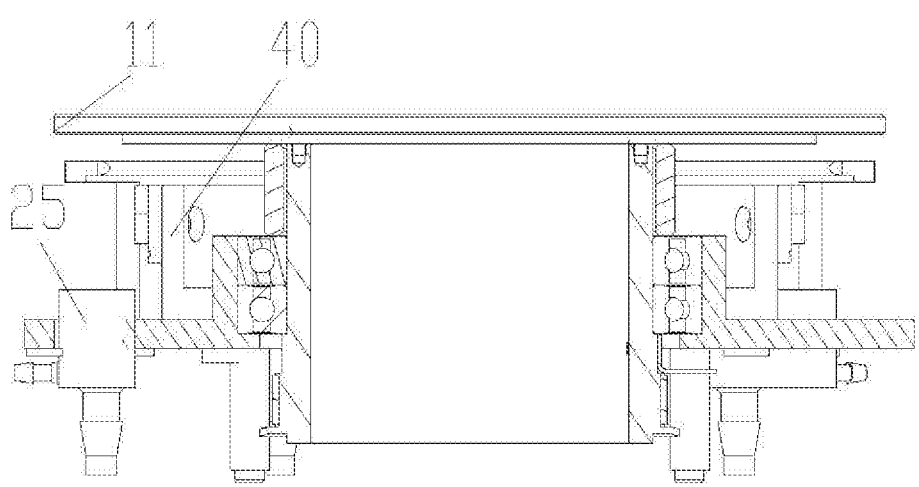
FIG. 8 shows a schematic diagram of a section view of a disk body assembly of a cleaning module of FIG. 1.

As shown in FIG. 8, in the technical solution of the embodiment, the cleaning module may further include a magnetic adsorption structure 40. The magnetic adsorption structure 40 is located downstream of the blending assembly 30, and located on a side, close to the central shaft of the disk body 11, of the reaction vessel. The magnetic adsorption structure 40 is provided, such that blended magnetic beads after the operation of blending are quickly centralized together. Specifically, the magnetic beads are gathered on the one side, close to the central shaft of the disk body 11, of the reaction vessel. An injecting direction of the fluid injecting needle is far away from the one side of, close to the central shaft of the disk body 11, the reaction vessel. In this way, the magnetic beads are prevented from splashing. Specifically, there are four groups of magnetic adsorption structures 40, and the four groups of magnetic adsorption structures 40 are located between the four pairs of waste fluid extracting needles 24 and fluid injecting needles 26, respectively.

As shown in FIGS. 1-4, in the technical solution of the embodiment, the disk body 11 has a central hole passing through the central shaft, and the transmission portion 23 is provided inside the central hole in a penetrating manner. With the adoption of the abovementioned structure, the cleaning module has compact structure. Specifically, a pipeline of the waste fluid extracting needle 24 and a pipeline of the fluid injecting needle pass through the central hole, in this way pipeline distances are equal, and accordingly back-pressures inside the pipelines are the same.

As shown in FIG. 8, in the technical solution of the embodiment, the first drive portion 12 may include a drive motor, a synchronous belt and a synchronous pulley. The synchronous pulley is mounted at a bottom of the disk body 11, the synchronous pulley has a mounting hole fitting the central hole, and the drive motor is connected with the synchronous pulley through the synchronous belt. The abovementioned structure has the low processing cost and convenient configuration, and configuration of the synchronous belt may not be influenced by the distance. Of course, as an alternative, the synchronous belt and the synchronous pulley may be replaced as gear structures.

As shown in FIG. 7, in the technical solution of the embodiment, the cleaning module may further include a reaction vessel detection sensor 50 and a fluid detection sensor 60. The reaction vessel detection sensor 50 and the fluid detection sensor 60 are provided corresponding to the reaction vessel. The reaction vessel detection sensor 50 is provided, such that the reaction vessel may be prevented from being missed. For example, when the reaction vessel is not placed in a certain reaction vessel placing portion, it may be timely found. The fluid detection sensor 60 is provided, such that missing injection of the cleaning fluid into the reaction vessel may be avoided. Specifically, the reaction vessel detection sensor and the fluid detection sensor correspond to an initial reaction vessel.

As other technical solutions which are implementable, the cleaning assembly 20 may further include the waste fluid extracting needle 24, the fluid injecting needle 26 and the fixing frame. The disk body 11 has the central hole passing through the center, the fixing frame is provided inside the central hole in a penetrating manner, the fluid injecting needle 26 is fixed on the fixing frame, the fixing frame is configured to fix the fluid injecting needle 26, the waste fluid extracting needle 24 is mounted on the mounting portion 22, the transmission portion 23 is provided inside the central hole in the penetrating manner, and the transmission portion 23 drives the waste fluid extracting needle 24 to move up and down in the vertical direction. The waste fluid extracting needle 24 and the fluid injecting needle 26 of the abovementioned structure may achieve separate configuration, and the structure has the low processing cost and convenient mounting and demounting. In other embodiments, as an alternative, the fixing frame may be located on a side of the disk body 11.

The application further provides a sample analyzer, including a sample analyzer body and a cleaning module. The cleaning module is the abovementioned cleaning module. The sample analyzer of the application has high cleaning efficiency, and the cleaning module has simple structure and few parts. An operating process of the sample analyzer may further include magnetic adsorption and other processes.

The application further provides a cleaning method. The cleaning method may include: A, a waste fluid extracting needle 24 is located at a waste fluid extracting station, and the waste fluid extracting needle 24 moves downward to extract waste fluid inside a reaction vessel; B, the waste fluid extracting needle 24 moves upward after completion of extraction of the waste fluid; C, a disk body 11 drives the reaction vessel to rotate to a cleaning station; D, the waste fluid extracting needle 24 moves downward to pass through the disk body 11 and enter into a cleaning pool 25; E, the cleaning pool 25 sprays cleaning fluid to clean the waste fluid extracting needle 24, and at the same time, a fluid injecting needle 26 injects the cleaning fluid into the reaction vessel; F, the waste fluid extracting needle 24 moves upward after completion of cleaning of the waste fluid extracting needle 24 and injection of the fluid injecting needle 26; G, the disk body 11 continues to rotate, in this way the waste fluid extracting needle 24 is located at a next waste fluid extracting station.

In the abovementioned cleaning method, when cleaning the waste fluid extracting needle 24, the fluid injecting needle 26 may complete injection of the fluid, in this way the cleaning efficiency is high. Because the cleaning pool 25 is located inside the disk body, no peripheral space is occupied, and accordingly the space occupied by the cleaning module is reduced, and a series of operations, such as extraction of the waste fluid, fluid injection and cleaning may be achieved when the disk body 11 and a cleaning assembly 20 rotate relatively. In this way, a solution inside the reaction vessel is cleaned. Before the step A, the cleaning method may further include injection of the cleaning fluid into the reaction vessel. The disk body 11 is provided with a through hole 112, the through hole 112 is provided corresponding to the cleaning pool 25, and the waste fluid extracting needle 24 passes through the through hole 112 to enter into the cleaning pool 25 for cleaning.

It is to be noted that terms used herein are merely intended to describe specific embodiments rather than limit exemplary embodiments according to the application. Unless otherwise pointed out explicitly, a singular form used herein is also intended to include a plural form. In addition, it should also be understood that the term "include" and/or "comprise" used in the description indicates that there are features, steps, operations, devices, assemblies and/or combinations thereof.

It is to be noted that terms "first", "second" and the like in the description, claims and the abovementioned drawings of the application are used for distinguishing similar objects rather than describing a specific sequence or a precedence order. It should be understood that data used in such a way may be exchanged where appropriate, in order that the embodiments of the application described here may be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

The above is merely preferred embodiments of the disclosure and not intended to limit the disclosure. For those skilled in the art, the disclosure may have various modifications and variations. Any modifications, equivalent replacements, improvements and the like within the spirit and principle of the disclosure shall fall within the scope of protection of the disclosure.

What is claimed is:

1. A cleaning module, comprising:
    a disk body assembly, the disk body assembly comprising a disk body configured to rotate, the disk body further comprising a cleaning station and a waste fluid extracting station each located within the perimeter of the disk body, wherein the disk body is further provided with a plurality of reaction vessel placing portions and a plurality of through holes, the waste fluid extracting station being located inside one of the plurality of the reaction vessel placing portions;
    a cleaning pool, the cleaning station being located in the cleaning pool, the cleaning pool being located under the plurality of reaction vessel placing portions, and the plurality of through holes being provided corresponding to the cleaning pool;
    a cleaning assembly, the cleaning assembly being provided with a waste fluid extracting needle that is movable to the waste fluid extracting station and the cleaning station, the waste fluid extracting station being an operating position where the cleaning assembly extracts waste fluid using the waste fluid extracting needle, and the cleaning station being an operating position where the waste fluid extracting needle passes through a corresponding through hole of the plurality of through holes such that at least part of the waste fluid extracting needle after passing through the corresponding through hole enters into the cleaning pool to clean the waste fluid extracting needle; and
    the cleaning assembly and the disk body being able to move relatively.

2. The cleaning module as claimed in claim 1, wherein, a side wall of the cleaning pool is provided with a fluid inlet, and a bottom wall of the cleaning pool is provided with a fluid outlet.

3. The cleaning module as claimed in claim 1, wherein, the cleaning assembly is able to move along a vertical direction to access the cleaning station and/or the waste fluid extracting station.

4. The cleaning module as claimed in claim 1, wherein, the disk body assembly further comprises a first drive portion, the first drive portion is connected with the disk body to drive the disk body to rotate, each of the plurality of through holes is provided between two adjacent reaction vessel placing portions of the plurality of reaction vessel placing portions, and a center of each of the plurality of reaction vessel placing portions and a center of each of the plurality of through holes are located on an identical concentric circle.

5. The cleaning module as claimed in claim 4, wherein, the cleaning assembly comprises a second drive portion, a mounting portion and a transmission potion, the second drive portion is connected with the transmission portion, and the transmission portion is connected with the mounting portion to drive the mounting portion to move up and down in a vertical direction.

6. The cleaning module as claimed in claim 5, wherein, the waste fluid extracting needle is mounted on the mounting portion, as to move up and down along with the mounting portion.

7. The cleaning module as claimed in claim 6, wherein, the cleaning assembly further comprises a fluid injecting needle, the fluid injecting needle and the waste fluid extracting needle are mounted on the mounting portion in pairs, in an identical pair of the fluid injecting needle and the waste fluid extracting needle, the fluid injecting needle is located downstream of the waste fluid extracting needle, and a horizontal distance from a fluid outlet of the fluid injecting needle to a fluid inlet of the waste fluid extracting needle is consistent with a distance from a center of one of the plurality of through holes to a center of one of the plurality of the reaction vessel placing portions adjacent to the one of the plurality of through holes.

8. The cleaning module as claimed in claim 7, wherein, there are a plurality of pairs of fluid injecting needles and waste fluid extracting needles, and the plurality of pairs of waste fluid extracting needles and fluid injecting needles are provided on the concentric circle.

9. The cleaning module as claimed in claim 8, wherein, the mounting portion is a plate-shaped structure, and the plurality of pairs of waste fluid extracting needles and fluid injecting needles are provided on the mounting portion at intervals.

10. The cleaning module as claimed in claim 5, wherein, distances of a center of each of the plurality of the through holes to centers of two reaction vessel placing portions of the plurality of the reaction vessel placing portions adjacent to the one of the plurality of through holes are equal.

11. The cleaning module as claimed in claim 5, wherein, the second drive portion is a drive motor, the transmission portion comprises a gear and a rack, the gear is mounted on a rotary shaft of the second drive portion, the rack cooperates with the gear, the rack is connected with the mounting portion to drive the mounting portion to move up and down, the transmission portion further comprises a sliding plate and a fixed plate, the rack is fixed on the sliding plate, the sliding plate is provided with a sliding chute, the fixed plate is fixed on the second drive portion, the fixed plate is provided with a guide rail fitting the sliding chute, and the mounting portion is mounted on the sliding plate.

12. The cleaning module as claimed in claim 4, wherein, the reaction vessel placing portions are mounting through holes, and reaction vessels are placed inside the mounting through holes.

13. The cleaning module as claimed in claim 5, wherein, the disk body is provided with a central hole passing through a central shaft, and the transmission portion is provided inside the central hole in a penetrating manner.

14. The cleaning module as claimed in claim 13, wherein, the first drive portion comprises a drive motor, a synchronous belt and a synchronous pulley, the synchronous pulley is mounted at a bottom of the disk body, the synchronous pulley is provided with a mounting hole fitting the central hole, and the drive motor is connected with the synchronous pulley through the synchronous belt.

15. The cleaning module as claimed in claim 4, wherein, the cleaning module further comprises a reaction vessel detection sensor and a fluid detection sensor, and the reaction vessel detection sensor and the fluid detection sensor are provided corresponding to reaction vessels.

16. The cleaning module as claimed in claim 5, wherein, the cleaning assembly further comprises a fluid injecting needle and a fixing frame, the disk body is provided with a central hole passing through a center of the disk body, the fixing frame is provided inside the central hole in a penetrating manner, the fluid injecting needle is fixed on the fixing frame, the waste fluid extracting needle is mounted on the mounting portion, and the transmission portion is located inside the central hole of the disk body.

* * * * *